United States Patent
Tu et al.

(10) Patent No.: US 11,588,400 B2
(45) Date of Patent: Feb. 21, 2023

(54) SERIES RESONATOR CONVERTER

(71) Applicant: VIRGINIA TECH INTELLECTUAL PROPERTIES, INC., Blacksburg, VA (US)

(72) Inventors: Cong Tu, Blacksburg, VA (US); Khai Doan The Ngo, Blacksburg, VA (US); Ting Ge, Union City, CA (US); Rengang Chen, Bethlehem, PA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 66 days.

(21) Appl. No.: 17/154,094

(22) Filed: Jan. 21, 2021

(65) Prior Publication Data

US 2022/0231609 A1 Jul. 21, 2022

(51) Int. Cl.
*H02M 3/158* (2006.01)
*H02M 1/44* (2007.01)
*H02M 1/00* (2006.01)
*H02M 3/00* (2006.01)

(52) U.S. Cl.
CPC ......... *H02M 3/158* (2013.01); *H02M 1/0058* (2021.05); *H02M 1/44* (2013.01); *H02M 3/01* (2021.05)

(58) Field of Classification Search
CPC ........ H02M 3/156; H02M 3/158; H02M 1/44; H02M 3/01; H02M 1/0058
See application file for complete search history.

(56) References Cited

U.S. PATENT DOCUMENTS

2013/0121033 A1* 5/2013 Lehn ................ H02M 3/33569
363/16
2021/0044216 A1* 2/2021 Riar ........................ B60L 58/21

OTHER PUBLICATIONS

Nishijima et al. "Analysis of Double Step-Down Two-Phase Buck Converter for VRM"; INTELEC 05—Twenty-Seventh International Telecommunications Conference, Berlin, 2005, pp. 497-502.
Jang et al. "Multiphase buck converters with extended duty cycle";Twenty-First Annual IEEE Applied Power Electronics Conference and Exposition, 2006. APEC '06., Dallas, TX, 2006, pp. 39-44.
Shenoy et al. "A 5 MHz, 12 V, 10 A, monolithically integrated two-phase series capacitor buck converter"; 2016 IEEE Applied Power Electronics Conference and Exposition (APEC), Long Beach, CA, 2016, pp. 66-72.
Shenoy et al. "Comparison of a Buck Converter and a Series Capacitor Buck Converter for High- Frequency, High-Conversion-Ratio Voltage Regulators"; IEEE Transactions on Power Electronics, vol. 31, No. 10, pp. 7006-7015, Oct. 2016.

(Continued)

*Primary Examiner* — Gary L Laxton
(74) *Attorney, Agent, or Firm* — Thomas Horstemeyer, LLP

(57) ABSTRACT

Aspects of series resonator DC-to-DC converters are described. A series resonator DC-to-DC converter can include a first half-bridge circuit comprising a first high-side switch and a first low-side switch, a second half-bridge circuit comprising a second high-side switch and a second low-side switch, and a resonator in series between the first high-side switch and the first low-side switch. The circuit design and switching controller can be relied upon to impart soft-switching.

20 Claims, 5 Drawing Sheets

(56) References Cited

OTHER PUBLICATIONS

Marvi et al. "Efficient ZVS Synchronous Buck Converter with Extended Duty Cycle and Low-Current Ripple"; IEEE Transactions on Industrial Electronics, vol. 63, No. 9, pp. 5403-5409, Sep. 2016.
Zhang et al. "An Interleaved Series-Capacitor Tapped Buck Converter for High Step-Down DC/DC Application"; Power Electronics IEEE Transactions on, vol. 34, No. 7, pp. 6565-6574, 2019.
Ge et al. "Steady-State Analysis of Resonant Cross-Commutated Buck Converter Under Continuous Voltage Mode"; IEEE Transactions on Industrial Electronics, vol. 65, No. 10, pp. 7782-7792, Oct. 2018.
TI Datasheet: "TPS54A20 8-V to 14-V Input, 10-A, up to 10-MHz SWIFT Step Down Converter"; Texas Instruments Inc., Dec. 2015. [Online]. Available: http://www.ti.com/product/TPS54A20.
Texas Instruments. "TI Application Report: Introduction to the Series Capacitor Buck Converter"; Apr. 2016. [Online]. Available: http://www.ti.com/lit/an/slva750a/slva750a.pdf.
Shenoy "Design of Multi-MHz Series Capacitor Buck Converters Used As Voltage Regulators"; Presented at 2017 IEEE Applied Power Electronics Conf. Exposition (APEC), Tampa, FL, Mar. 2017. [Online]. Available: http://www.ti.com/lit/ml/slyy129/slyy129.pdf.
Ge "Resonant Cross-Commutated Dc-Dc Regulators with Omni-Coupled Inductors"; Virginia Polytechnic Institute and State University, Blacksburg, VA, 2018.
Ahmed et al. "Single-Stage High-Efficiency 48/1V Sigma Converter with Integrated"; IEEE Transactions on Industrial Electronics Magnetics.
Zheng et al. "Nonisolated High Step-Down Converter With ZVS and Low Current Ripples"; IEEE Transactions on Industrial Electronics, vol. 66, No. 2, pp. 1068-1079, Feb. 2019.

* cited by examiner

SERIES RESONATOR CONVERTER

BACKGROUND

Direct current (DC) power delivery systems can use a number of differing supply voltages. For example, 1 Volt, 3.3 Volts, 5 Volts, 12 Volts, 48 Volts, and others. Compared with conventional 12-Volt power delivery, 48-Volt power delivery offers some advantages. A 48-Volt system can reduce power distribution losses, as well as provide for a reduced conductor size, which can lead to reduced weight and cost compared with 12-Volt and other lower voltage power delivery systems.

Power distribution and delivery systems at higher DC voltages are becoming more common for the benefits of smaller distribution loss. However, some devices still require lower voltages than those of the power distribution and delivery systems. For example, many modern CPUs and GPUs are designed for power supply potentials of less than 1.5 V. The use of lower voltages can help to reduce power dissipation and the requirements for complicated and expensive cooling systems. These lower voltages can be achieved using single stage DC-to-DC converters and two-stage DC-to-DC converters. However, the existing single stage solutions need a multi-winding inductor to provide an ultra-small voltage gain and enable soft switching. In the existing two-stage solutions, the first stage provides a fix voltage gain and the second stage can suffer from low efficiency. As a result, there is a need for more variable and more efficient solutions for DC-to-DC converters.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

The present disclosure relates to soft-switched series-resonator direct current (DC) to DC converters. Power distribution and delivery systems at higher DC voltages are becoming more common for the benefits of smaller distribution loss. However, some devices still require lower voltages than those of the power distribution and delivery systems. For example, many modern CPUs and GPUs are designed for power supply potentials of less than 1.5 V. The use of lower voltages can help to reduce power dissipation and the requirements for complicated and expensive cooling systems. These lower voltages can be achieved using single stage DC-to-DC converters and two-stage DC-to-DC converters. However, the existing single stage solutions need a multi-winding inductor to provide an ultra-small voltage gain and enable soft switching. In the existing two-stage solutions, the first stage provides a fix voltage gain and the second stage can suffer from low efficiency. As a result, there is a need for more variable and more efficient solutions for DC-to-DC converters. The present disclosure describes mechanisms that can provide variable output voltages at a high efficiency using soft-switched series-resonator DC-to-DC converters without multi-winding inductor components.

Figure 1:
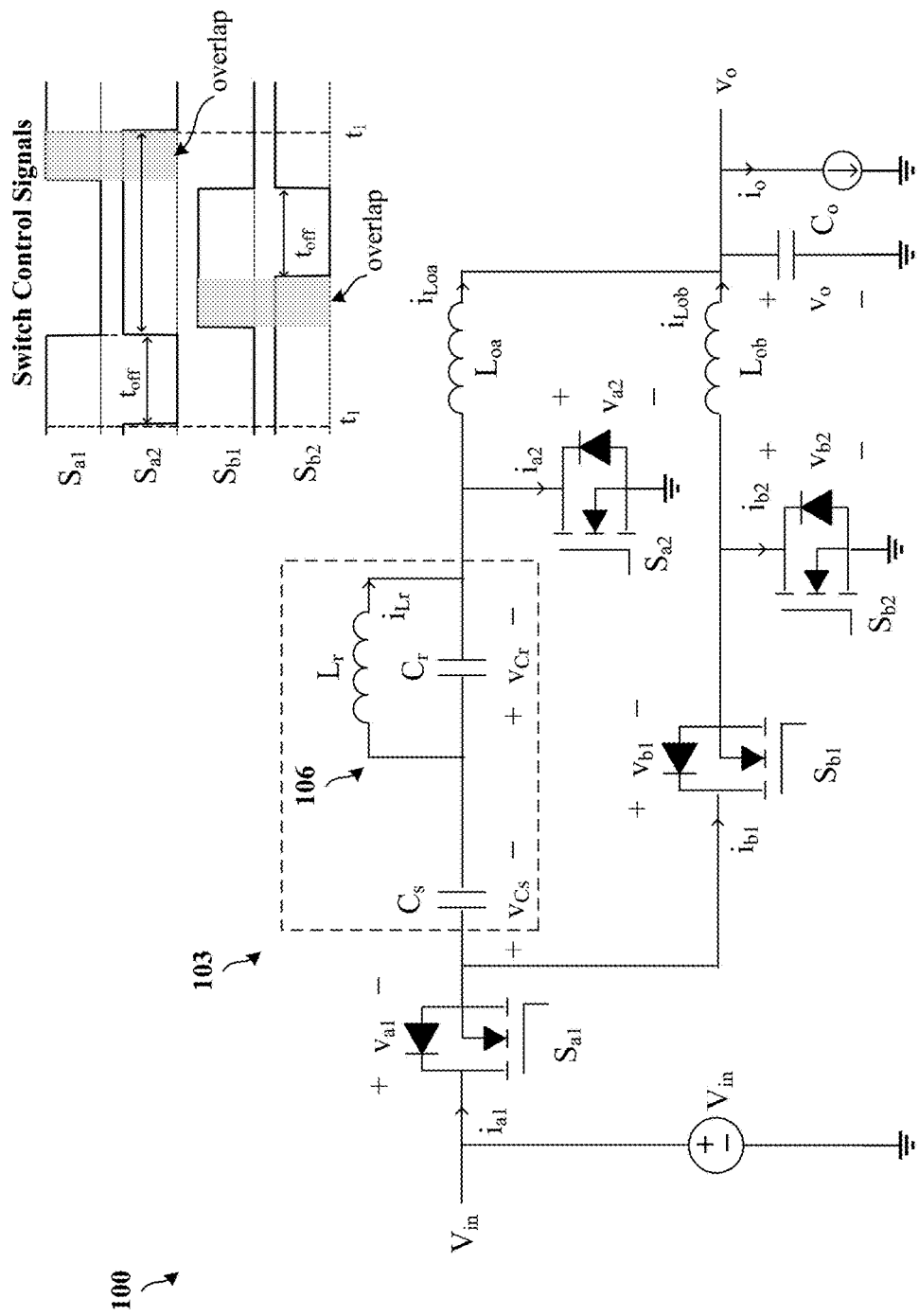
FIG. 1 illustrates an example of a series resonator converter, according to embodiments of the present disclosure.

FIG. 1 illustrates an example of a series resonator converter 100. The series resonator converter 100 with soft turn-on can be synthesized by using a resonator that includes a resonant tank in series with a capacitor Cs. In this paradigm, all switches can turn on into zero-voltage (ZVOn). In other words, a switch can be switched closed in conditions where there is zero voltage across the switch. Low-side switches can turn off from zero-current (ZCOff). In other words, a low-side switch can be switched open in conditions where there is zero current across the switch. The series resonator converter 100 can operate without a snubber to keep switch stresses within the input voltage. Some examples can include a 2-MHz circuit with 48V at the input, and 7V, 20 A at the output. However, other frequencies and voltages can be used, as can be understood. The series resonator converter 100 can operate efficiently at MHz level, can provide wide variable gain with duty-cycle related off-time $t_{off}$ control, can provide a semi-regulated output voltage, and can do so without including a multi-winding inductor.

The series resonator converter 100 can include switches $S_{a1}$, $S_{a2}$, $S_{b1}$, and $S_{b2}$. Switches $S_{a1}$ and $S_{a2}$ can be, respectively, a high-side switch and a low-side switch of a first half-bridge circuit of the series resonator converter 100. Switches $S_{b1}$ and $S_{b2}$ can be, respectively, a high-side switch and a low-side switch of a second half-bridge circuit of the series resonator converter 100.

A switching controller of the series resonator converter 100 can control the switching of these switches so that all switches $S_{a1}$, $S_{a2}$, $S_{b1}$, and $S_{b2}$ use a ZVOn paradigm that switches closed or switches on in conditions where there is zero voltage across the switch. The switching controller can control the switching so that low-side switches $S_{a2}$, and $S_{b2}$ can use a ZVOff paradigm that switches open or switches off in conditions where there is zero current across the switch. This soft switching can increase efficiency of the series resonator converter 100 and lower conductive EMI noise.

The series resonator converter 100 can include a series resonator 103. The series resonator 103 can include a series capacitor Cs and a resonant tank 106 in series with each other. The series resonator 103 can be in series between switches $S_{a1}$ and $S_{a2}$. In other words, from $V_{in}$ to ground, the series components can include switch $S_{a1}$, series resonator 103, and $S_{a2}$.

The resonant tank 106 can include an inductor $L_r$ that stores circulating energy for soft switching. In the design shown, $C_s \gg C_r$, $L_{oa} \gg L_r$, and $L_{oB} \gg L_r$. In some examples, much greater than ($\gg$) can refer to at or about an order of magnitude or ten times greater than. The resonant phenomenon only shows between $L_r$ and $C_r$. The resonant frequency $f_r$ can be defined as $f_r = 1/(2\pi\sqrt{L_r C_r})$. While the resonant tank 106 can refer to a second-order parallel resonant tank circuit with two components, the resonant tank 106 can also refer to a third-order resonant tank having three components, a fourth-order resonant tank having four components, or any $n^{th}$-order resonant tank with n components, where n is an integer greater than or equal to two. The components of the resonant tank 106 can include reactive circuit components of an $n^{th}$-order LC resonant tank. In other cases, the components of the resonant tank 106 can include resistive and reactive circuit components of an $n^{th}$-order RLC resonant tank.

The series resonator converter 100 can be a duty-cycle-regulated (or semi-regulated) wide variable gain DC-to-DC converter, which can be used as a first stage in a two-stage DC-to-DC converter. The second stage circuit can include a regulated stage with approximately X:1 gain, where X is an output voltage $V_o$ of the series resonator converter 100. In some cases, the output voltage of the series resonator converter 100 can include DC voltages of about 7V to about 3V, about 5.5V to about 4.5V, and other ranges. In some examples an input voltage $V_i$ can include a DC voltage of 43-60V. The input voltage $V_i$ can be provided as input to the series resonator converter 100 through a DC bus. The output voltage $V_o$ can be output to a high efficiency regulated second stage circuit.

Switches $S_{a1}$ and $S_{a2}$ can be respective high-side and low-side switches of a half-bridge circuit of the series resonator converter 100. The series resonator 103 can be connected in series between $S_{a1}$ and $S_{a1}$. Switches $S_{b1}$ and $S_{b2}$ can be respective high-side and low-side switches of another half-bridge circuit of the series resonator converter 100. The switches $S_{b1}$ and $S_{b2}$ can be connected to a node between $S_{a1}$ and the series resonator 103.

Figure 2:
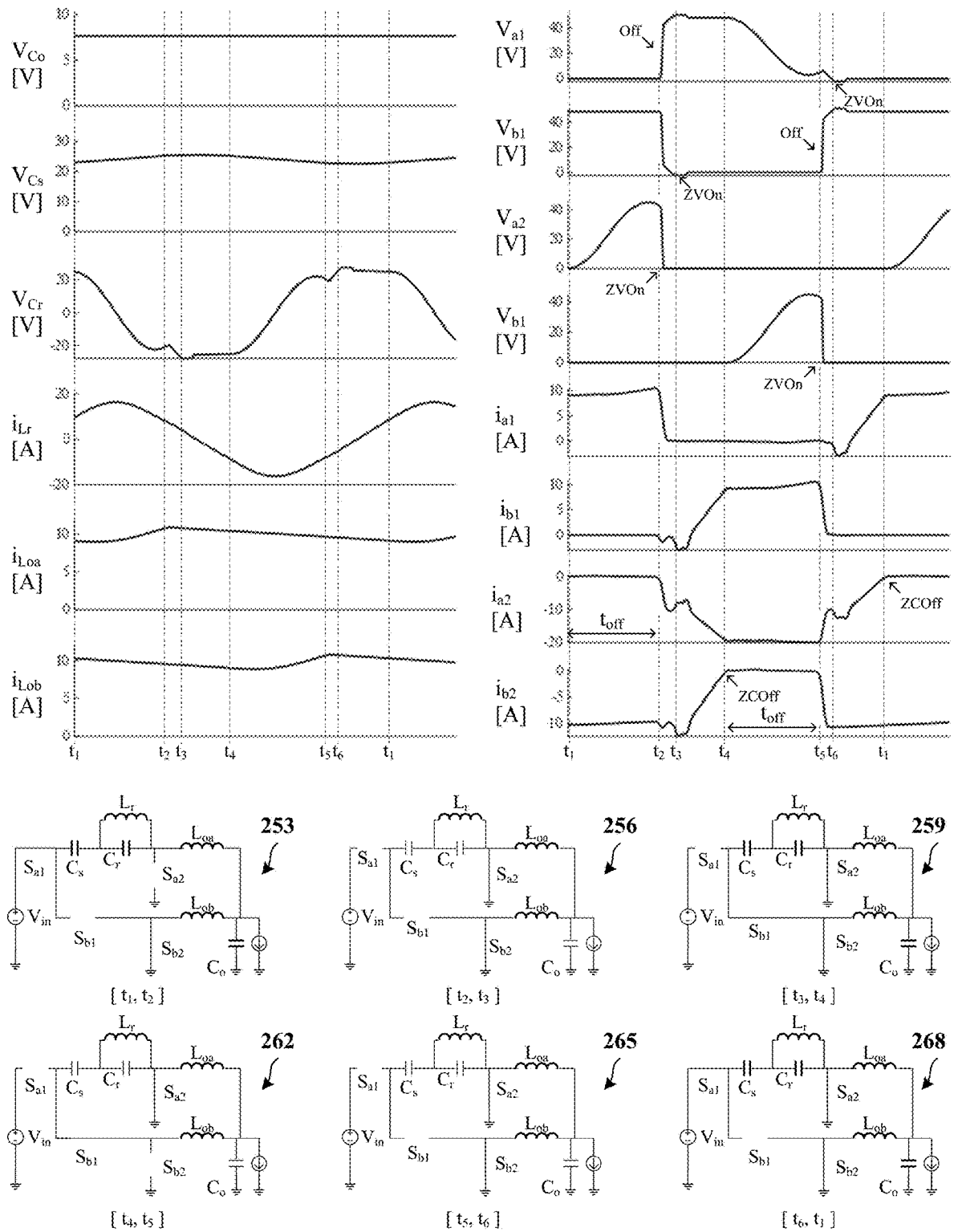
FIG. 2 illustrates an example of the operation of the series resonator converter of FIG. 1, according to embodiments of the present disclosure.

FIG. 2 shows graphs of various example parameters that can illustrate the operation of a switching period of the series resonator converter 100, along with examples of various switching states of the series resonator converter 100. The graphs include plots of $V_{Co}$ in Volts, $V_{Cs}$ in Volts, $V_{Cr}$ in Volts, $i_{Lr}$ in Amps, $i_{Loa}$ in Amps, $i_{Lob}$ in Amps, $V_{a1}$ in Volts, $V_{b1}$ in Volts, $V_{a2}$ in Volts, $V_{b2}$ in Volts, $i_{a1}$ in Amps, $i_{b1}$ in Amps, $i_{a2}$ in Amps, and $i_{b2}$ in Amps. Each of these parameters is shown graphed over a switching period of the series resonator converter 100. As indicated earlier, the switching controller can control the switching so that all switches $S_{a1}$, $S_{a2}$, $S_{b1}$, and $S_{b2}$ can turn on or close into zero-voltage (ZVOn), and low-side switches $S_{a2}$, and $S_{b2}$ can turn off or open from zero-current (ZCOff).

Switching state 253 shows the series resonator converter 100 from time $t_1$ to $t_2$. In switching state 253, switch $S_{a1}$ is closed, switch $S_{b1}$ is opened, switch $S_{a2}$ is opened, and switch $S_{b2}$ is closed. While $t_1$ is shown as an initial state of the series resonator converter 100, other switching states can be used as the initial state.

At time $t_2$, switching state 253 can change to switching state 256. Switching state 256 shows the series resonator converter 100 from time $t_2$ to $t_3$. A switching controller can, based on detected circuit parameters and a timing identified using a timing controller, determine that the series resonator converter 100 is to be switched to the switching state 256 at time $t_2$. In switching state 256, switch $S_{a1}$ is opened, switch $S_{b1}$ remains opened, switch $S_{a2}$ is closed, and switch $S_{b2}$ remains closed.

A switching controller can generate updated control signals for switches $S_{a1}$ and $S_{a2}$. This can cause the switch $S_{a1}$ to open and the switch $S_{a2}$ to close at time $t_2$. The other control signals can remain the same at time $t_2$. At switching time $t_2$ the switch $S_{a1}$ can be opened based on a control parameter $t_{off}$. This can control a duty cycle of the series resonator converter 100. Controlling the duty cycle by selecting a particular $t_{off}$ can enable the wide variable gain of the series resonator converter 100. Also at switching time $t_2$, or soon thereafter based on the switching of $S_{a1}$, the switch $S_{a2}$ can be closed. As shown in the plot of current $V_{a2}$, which is the Voltage across switch $S_{a2}$, is 0 at time $t_2$ or soon thereafter based on the switching of $S_{a1}$. As a result, we can see that the switching controller can use ZVOn switching to control switch $S_{a2}$ to switch closed once $V_{a2}$ is zero.

At time $t_3$, switching state 256 can change to switching state 259. Switching state 259 shows the series resonator converter 100 from time $t_3$ to $t_4$. A switching controller can, based on detected circuit parameters and a timing identified using a timing controller, determine that the series resonator converter 100 is to be switched to the switching state 259 at time $t_3$. In switching state 259, switch $S_{b1}$ is closed into ZVOn, since Voltage across switch $S_{b1}$ is 0 at time $t_3$. In switching state 259, switch $S_{b1}$ is closed, switch $S_{a1}$ remains opened, switch $S_{a2}$ remains closed, and switch $S_{b2}$ remains closed.

At time $t_4$, switching state 259 can change to switching state 262. Switching state 262 shows the series resonator converter 100 from time $t_4$ to $t_5$. A switching controller can, based on detected circuit parameters and a timing identified using a timing controller, determine that the series resonator converter 100 is to be switched to the switching state 262 at time $t_4$. In switching state 262, switch $S_{b2}$ is opened into ZCOff, since current through switch $S_{b2}$ is 0 at time $t_4$. In switching state 262, switch $S_{b2}$ is opened, switch $S_{b1}$ remains closed, switch $S_{a1}$ remains opened, and switch $S_{a2}$ remains closed.

At time $t_5$, switching state 262 can change to switching state 265. Switching state 265 shows the series resonator converter 100 from time $t_5$ to $t_6$. A switching controller can, based on detected circuit parameters and a timing identified using a timing controller, determine that the series resonator converter 100 is to be switched to the switching state 265 at time $t_5$. In switching state 265, switch $S_{b1}$ can be opened based on the control parameter $t_{off}$. This can control a duty cycle of the series resonator converter 100. Controlling the duty cycle by selecting a particular $t_{off}$ can enable the wide variable gain of the series resonator converter 100. Also at switching time $t_5$, or soon thereafter based on the switching of $S_{b1}$, the switch $S_{b2}$ can be closed. As shown in the plot of current $V_{b2}$, which is the Voltage across switch $S_{b2}$, is 0 at time $t_5$ or soon thereafter based on the switching of $S_{b1}$. As a result, we can see that the switching controller can use ZVOn switching to control switch $S_{b2}$ to switch closed once $V_{b2}$ is zero. In switching state 265, switch $S_{b1}$ is opened, switch $S_{b2}$ closed, switch $S_{a1}$ remains opened, and switch $S_{a2}$ remains closed.

At time $t_6$, switching state 265 can change to switching state 268. Switching state 268 shows the series resonator converter 100 from time $t_6$ to $t_1$. A switching controller can, based on detected circuit parameters and a timing identified using a timing controller, determine that the series resonator converter 100 is to be switched to the switching state 268 at time $t_6$. In switching state 268, switch $S_{a1}$ is closed into ZVOn, since Voltage across switch $S_{a1}$ is 0 at time $t_6$. In switching state 268, switch $S_{a1}$ is closed, switch $S_{b1}$ remains open, switch $S_{a2}$ remains closed, and switch $S_{b2}$ remains closed.

At time $t_1$, switching state 268 can change to switching state 253. Switching state 253 shows the series resonator converter 100 from time $t_1$ to $t_2$. A switching controller can, based on detected circuit parameters and a timing identified using a timing controller, determine that the series resonator converter 100 is to be switched to the switching state 253 at time $t_1$. In switching state 253, switch $S_{a2}$ is opened into ZCOff, since the current through switch $S_{a2}$ is 0 at time $t_1$. In switching state 253, switch $S_{a2}$ is opened, switch $S_{a1}$ remains closed, switch $S_{b1}$ remains opened, and switch $S_{b2}$ remains closed.

Figure 3:
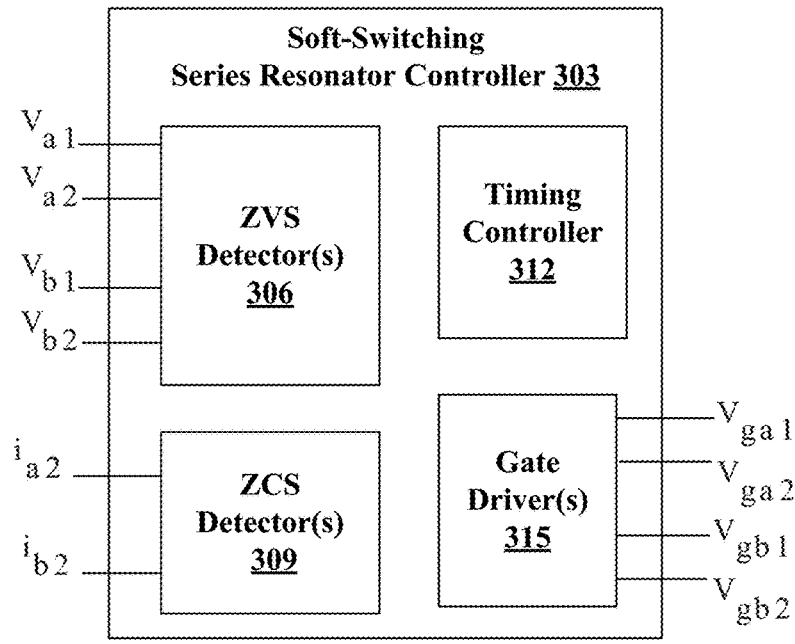
FIG. 3 illustrates an example of a soft-switching series resonator controller for the series resonator converter of FIG. 1, according to embodiments of the present disclosure.
Figure 3:
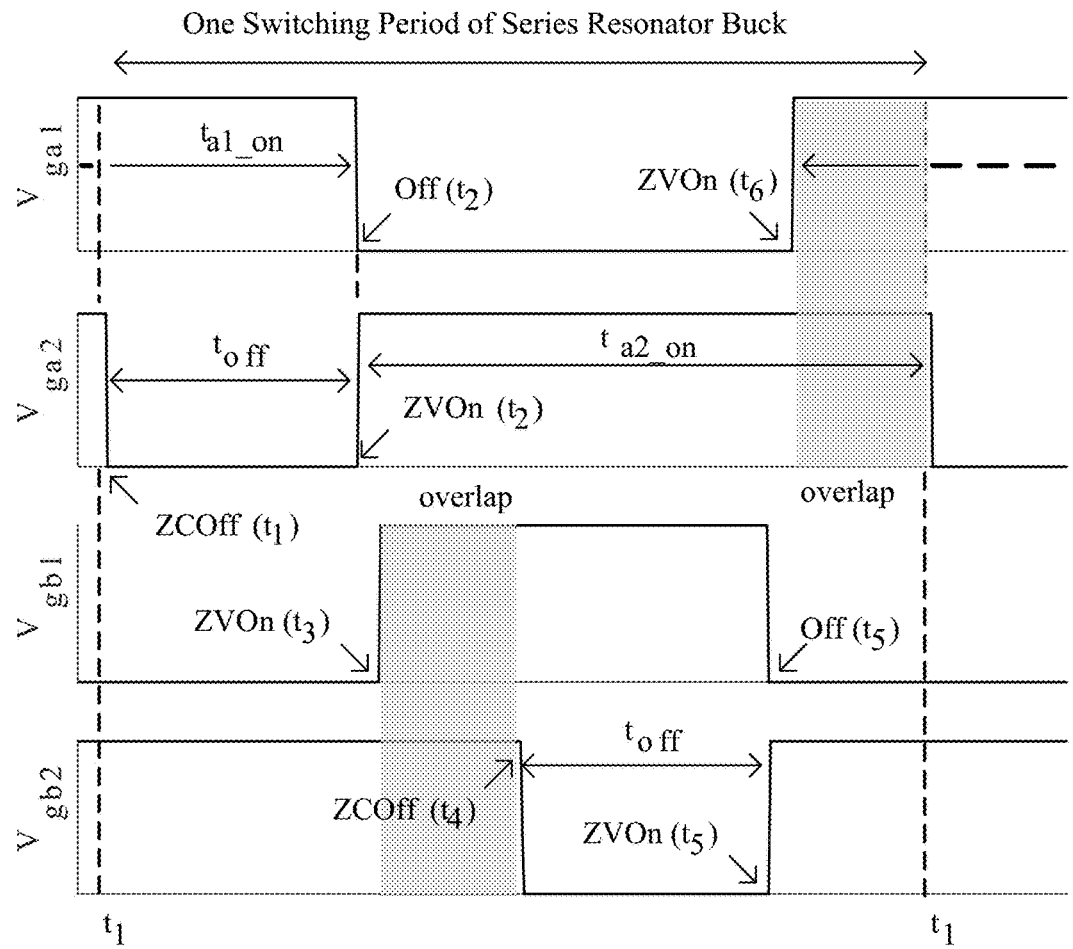

FIG. 3 illustrates an example of a soft-switching series resonator controller 303 for the series resonator converter 100. The soft-switching series resonator controller 303 can be a switching controller that switches the series resonator converter 100 with a soft-switching paradigm that causes all switches $S_{a1}$, $S_{a2}$, $S_{b1}$, and $S_{b2}$ to efficiently turn on into zero-voltage and causes the low-side switches $S_{a2}$ and $S_{b2}$ to turn off or open into zero-current.

The soft-switching series resonator controller 303 can include one or more ZVS detectors 306 corresponding to the switches Sai, $S_{a2}$, $S_{b1}$, and $S_{b2}$. The ZVS detectors 306 can take as inputs the respective Voltages $V_{a1}$, $V_{a2}$, $V_{b1}$, and $V_{b2}$ across the switches. This can enable the soft-switching series resonator controller 303 to cause all switches Sai, $S_{a2}$, $S_{b1}$, and $S_{b2}$ to efficiently turn on into zero-voltage.

The soft-switching series resonator controller 303 can include one or more ZCS detectors 309 corresponding to low-side switches $S_{a2}$ and $S_{b2}$. The ZCS detectors 309 can take as inputs the respective currents $i_{a2}$ and $i_{b2}$ across the switches $S_{a2}$ and $S_{b2}$. This can enable the soft-switching series resonator controller 303 to cause switches $S_{a2}$ and $S_{b2}$ to efficiently turn off or open into zero-current.

The soft-switching series resonator controller 303 can include a timing controller 312. The timing controller 312 can maintain and track the timing of the switching period of the series resonator converter 100. In addition, the timing controller 312 can calculate or identify a $t_{off}$ timing that corresponds to a predetermined desired gain of the series resonator converter 100. This can enable a wide variable gain based on a duty cycle corresponding to $t_{off}$. The timing controller 312 can identify $t_{off}$ based on the desired gain using a mapping stored in a datastore of, or a datastore accessible to, the soft-switching series resonator controller 303. In other cases, the timing controller 312 can calculate $t_{off}$ by inputting the desired gain into a gain-to-duty cycle conversion algorithm stored in a datastore of, or a datastore accessible to, the soft-switching series resonator controller 303.

The soft-switching series resonator controller 303 can include one or more gate drivers 315. The soft-switching series resonator controller 303 can take inputs including: detected circuit parameters including Voltages $V_{a1}$, $V_{a2}$, $V_{b1}$, and $V_{b2}$ and currents $i_{a2}$ and $i_{b2}$; timing identified using the timing controller 312; and a current or existing switching state of the series resonator converter 100. Based on these factors, the soft-switching series resonator controller 303 can use the gate drivers 315 to output updated switch gate control signals $V_{ga1}$, $V_{ga2}$, $V_{gb1}$, and $V_{gb2}$ to update the switching state to an updated switching state.

At time t1, the soft-switching series resonator controller 303 can update $V_{ga2}$ causing switch $S_{a2}$ to be opened, while maintaining $V_{ga1}$, $V_{gb1}$, and $V_{gb2}$, so switch $S_{a1}$ remains closed, switch $S_{b1}$ remains opened, and switch $S_{b2}$ remains closed.

At time $t_2$, the soft-switching series resonator controller 303 can update $V_{ga1}$ causing switch $S_{a1}$ to be opened based on a desired gain or off-timing $t_{off}$, and also update $V_{ga2}$ causing switch $S_{a2}$ to be closed into ZVOn, while maintaining $V_{gb1}$ and $V_{gb2}$ so that switch $S_{b1}$ remains opened and switch $S_{b2}$ remains closed.

At time $t_3$, the soft-switching series resonator controller 303 can update $V_{gb1}$ so that switch $S_{b1}$ is closed into ZVOn, and maintain $V_{ga1}$, $V_{a2}$, and $V_{gb2}$ so that switch $S_{a1}$ remains opened, switch $S_{a2}$ remains closed, and switch $S_{b2}$ remains closed.

At time $t_4$, the soft-switching series resonator controller 303 can update $V_{gb2}$ so that switch $S_{b2}$ is opened into ZCOff, while maintaining the other gate control signals so that switch $S_{b1}$ remains closed, switch $S_{a1}$ remains opened, and switch $S_{a2}$ remains closed.

At time $t_5$, the soft-switching series resonator controller 303 can update $V_{gb1}$ so that $S_{b1}$ is opened based on a desired gain or off-timing $t_{off}$, and can also update $V_{gb2}$ so that switch $S_{b2}$ is closed into ZVOn, while maintaining the other gate control signals so that switch $S_{a1}$ remains opened, and switch $S_{a2}$ remains closed.

At time $t_6$, the soft-switching series resonator controller 303 can update $V_{ga1}$ so that switch $S_{a1}$ is closed, while maintaining the other gate control signals so that switch $S_{b1}$ remains open, switch $S_{a2}$ remains closed, and switch $S_{b2}$ remains closed.

At time $t_1$, the soft-switching series resonator controller 303 can update $V_{ga2}$ so that switch $S_{a2}$ is opened, while maintaining the other gate control signals so that switch $S_{a1}$ remains closed, switch $S_{b1}$ remains opened, and switch $S_{b2}$ remains closed.

As can be seen, gate control signal $V_{ga1}$ and $V_{ga2}$ have overlapping or concurrent on-states. Likewise, gate control signal $V_{gb1}$ and $V_{gb2}$ have overlapping or concurrent on-states. By contrast, traditional systems provide gate control signals that cause opposite states at all times for high-side switches and low-side switches. The soft-switching series resonator controller 303 can select an off-timing $t_{off}$ thereby providing duty-cycle gain control of the series resonator converter 100.

Figure 4:
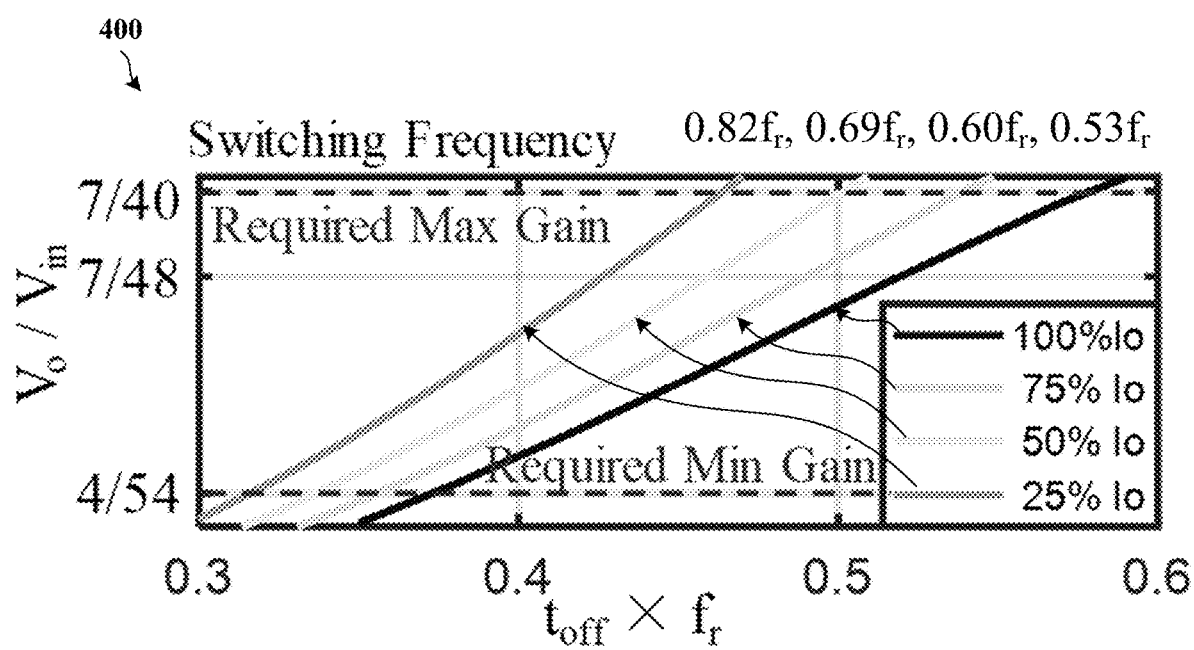
FIG. 4 illustrates a graph that shows an example of duty-related gains for the series resonator converter of FIG. 1, according to embodiments of the present disclosure.

FIG. 4 shows a graph 400 of duty-related gains for an example series resonator converter 100. The graph 400 shows how the gain of the series resonator converter 100 can be affected based on a duty cycle corresponding to a selected off timing $t_{off}$. The resonance frequency $f_r$ can also affect the gain of the series resonator converter 100. As a result, in some cases, the series resonator converter 100 can be designed to have a resonance frequency $f_r$ based on the desired gain.

Figure 5:
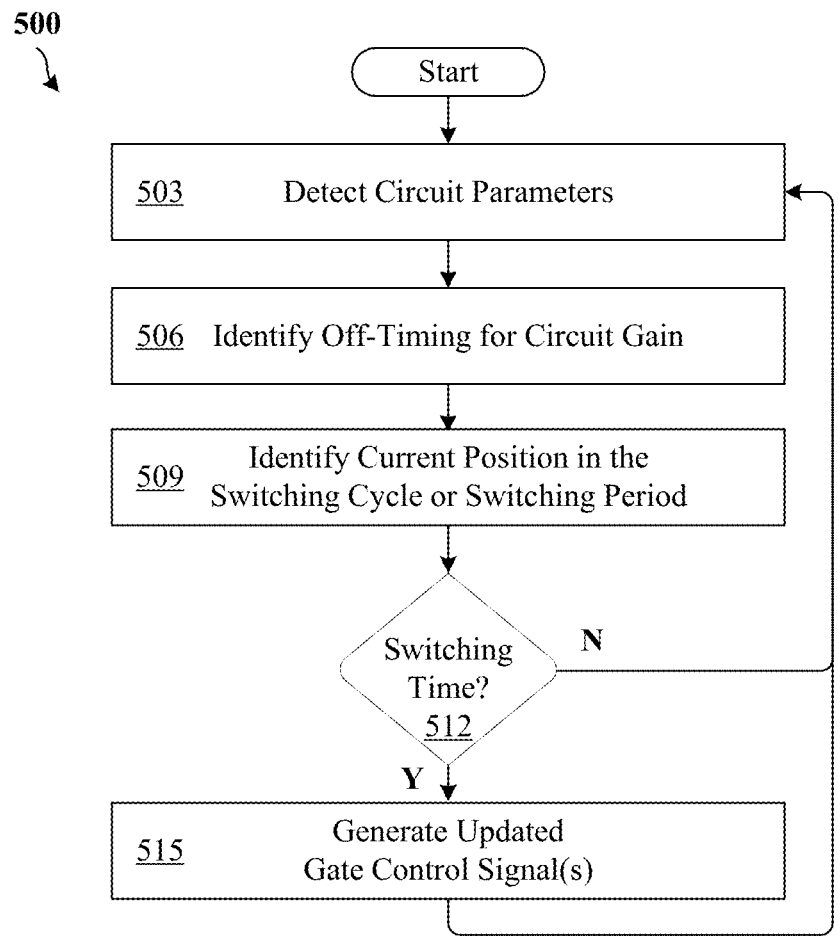
FIG. 5 illustrates a flowchart of functionalities performed by the series resonator converter of FIG. 1, according to embodiments of the present disclosure.

FIG. 5 shows a flowchart 500 that describes functionalities of the series resonator converter 100. While the steps of the flowchart 500 can be referred to as performed by the soft-switching series resonator controller 303, certain aspects of the flowchart 500 can be performed using other components of the series resonator converter 100, as well as other components of a DC-to-DC converter. Segmentation and arrangement of the order of the steps are by way of example. The steps can be performed in another order, scrambled relative to one another in any sequence and/or concurrently with any level of timing overlap as can be understood.

In step 503, the soft-switching series resonator controller 303 can detect and monitor real-time circuit parameters of the series resonator converter 100. The soft-switching series resonator controller 303 can include one or more ZVS detectors 306 that can detect or identify input circuit parameters including the respective Voltages $V_{a1}$, Vat, $V_{b1}$, and $V_{b2}$ across the switches. The soft-switching series resonator controller 303 can also include one or more ZCS detectors 309 that can detect or identify input circuit parameters including the respective currents $i_{a2}$ and $i_{b2}$ across the switches $S_{a2}$ and $S_{b2}$.

In step 506, the soft-switching series resonator controller 303 can identify an off-timing $t_{off}$ for a predetermined or desired gain for the series resonator converter 100. The soft-switching series resonator controller 303 can calculate or identify a $t_{off}$ timing that corresponds to a desired gain and a resonance frequency $f_r$ of the series resonator converter 100. The timing controller 312 can identify $t_{off}$ using the desired gain and the resonance frequency $f_r$ as input parameters for a mapping, table, or other data structure that associates a $t_{off}$ for the desired gain and the resonance frequency $f_r$. In other cases, the timing controller 312 can calculate $t_{off}$ by using the desired gain and the resonance frequency $f_r$ as input parameters for a gain-to-duty cycle conversion algorithm.

In step 509, the soft-switching series resonator controller 303 can identify a current position in a switching cycle or switching period of the series resonator converter 100. For example, the soft-switching series resonator controller 303 can include a timing controller 312 that maintains and tracks the timing of the switching period of the series resonator converter 100. The timing controller 312 can include a clock or timer, and can also measure, store, or otherwise identify a switching state of the series resonator converter 100 using the switching state and a state of the clock or timer. The timing controller 312 can measure or otherwise identify the gate control signal voltages in order to identify the switching state. The timing controller 312 can also store previous switching states, and use a progression pattern to identify the current position in a switching cycle.

In step 512, if a switching time is identified, such as $t_1$, $t_2$, $t_3$, $t_4$, $t_5$, or $t_6$ as discussed, then the soft-switching series resonator controller 303 can move to step 515. Otherwise the process can move to step 503.

In step 515, the soft-switching series resonator controller 303 can generate at least one updated gate control signal. The gate control signals can include $V_{ga1}$, $V_{ga2}$, $V_{gb1}$, and $V_{gb2}$. The gate control signals can be updated as indicated with respect to FIGS. 2 and 3.

Although the functionalities, services, programs, and computer instructions described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Although flowcharts can show a specific order of execution, it is understood that the order of execution can differ from that which is depicted. For example, the order of execution of two or more blocks can be scrambled relative to the order shown. The flowcharts can be viewed as depicting an example of a method implemented by a computing device. The flowchart can also be viewed as depicting an example of instructions executed in a computing device. Also, two or more blocks shown in succession can be executed concurrently or with partial concurrence. Further, in some embodiments, one or more of the blocks shown can be skipped or omitted. In addition, any number of counters, state variables, semaphores, or warning messages might be added to the logical flow described herein, for purposes of enhanced utility, accounting, performance measurement, or providing troubleshooting aids, etc. It is understood that all such variations are within the scope of the present disclosure.

Also, the functionalities described herein that include software or code instructions can be embodied in any non-transitory computer-readable medium, which can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or functionality described herein can be implemented and structured in a variety of ways. For example, one or more applications described can be implemented as modules or components of a single application or set of instructions. Further, one or more instructions described herein can be executed in shared or separate computing devices or a combination thereof.

The above-described examples of the present disclosure are merely possible examples of implementations set forth for a clear understanding of the principles of the disclosure. While aspects and figures are provided for clarity of discussion, it is understood that the concepts described with respect to a particular figure or context can be utilized and combined with the concepts described with respect to the other figures and contexts. These variations and modifications can be made without departing substantially from the principles of the disclosure. All such modifications and variations are intended to be included herein within the scope of this disclosure and protected by the following claims.

Therefore, the following is claimed:

1. A soft-switching series resonator DC-to-DC converter, comprising:
   a first half-bridge circuit comprising a first high-side switch and a first low-side switch;
   a second half-bridge circuit comprising a second high-side switch and a second low-side switch;
   a resonator in series between the first high-side switch and the first low-side switch; and
   a switching controller that controls at least one switching period of the soft-switching DC-to-DC converter based at least in part on an off-timing associated with a gain of the soft-switching DC-to-DC converter.

2. The soft-switching DC-to-DC converter of claim 1, wherein the switching controller generates at least one gate control signal to control the first high-side switch, the second high-side switch, the first low-side switch, and the second low-side switch to control the at least one switching period.

3. The soft-switching DC-to-DC converter of claim 1, wherein the switching controller causes the first high-side switch, the second high-side switch, the first low-side switch, and the second low-side switch to be closed into zero-voltage throughout the at least one switching period.

4. The soft-switching DC-to-DC converter of claim 1, wherein the switching controller causes the first low-side switch and the second low-side switch to be opened into zero-current throughout the at least one switching period.

5. The soft-switching DC-to-DC converter of claim 1, wherein the resonator comprises an $n^{th}$-order resonant tank circuit, wherein n is an integer value greater than or equal to two.

6. The soft-switching DC-to-DC converter of claim 1, wherein the resonator comprises a capacitor in series with a resonant tank.

7. The soft-switching DC-to-DC converter of claim 6, wherein the resonant tank comprises a resonant tank capacitor parallel with a resonant tank inductor.

8. A method for controlling a series resonator DC-to-DC converter, the method comprising:
   identifying, by a switching controller, at least one detected circuit parameter of the series resonator DC-to-DC converter, the series resonator DC-to-DC converter comprising a first half-bridge circuit comprising a first high-side switch and a first low-side switch, a second half-bridge circuit comprising a second high-side switch and a second low-side switch, and a resonator in series between the first high-side switch and the first low-side switch; and
   generating, by the switching controller, at least one gate control signal for the first high-side switch, the first low-side switch, the second high-side switch, and the second low-side switch through at least one switching period, wherein the switching controller controls the at least one switching period based at least in part on an off-timing associated with a gain of the series resonator DC-to-DC converter.

9. The method of claim 8, further comprising:
   closing, by the switching controller, the first high-side switch, the second high-side switch, the first low-side switch, and the second low-side switch to be closed in at least one condition where there is zero-voltage across a respective switch.

10. The method of claim 8, further comprising:
    identifying, by the switching controller, the off-timing associated with a predetermined gain, wherein the gain is the predetermined gain.

11. The method of claim 10, further comprising:
    switching off, by the switching controller, at least one of the first high-side switch and the second high-side switch based at least in part on the off-timing.

12. The method of claim 8, further comprising:
    identifying, by the switching controller, a switching time based at least in part on the at least one detected circuit parameter;
    identifying, by the switching controller, a switching state for the switching time; and
    generating, by the switching controller, the at least one gate control signal based at least in part on the switching state for the switching time.

13. The method of claim 8, wherein a first high-side gate control signal for the first high-side switch comprises an overlapping on-state with a second high-side gate control signal for the second high-side switch.

14. The method of claim 13, wherein the overlapping on-state ends based at least in part on the second high-side gate control signal being switched to an off-state upon detection of zero current through the second high-side switch.

15. A power converter system comprising:
    a resonator in series between a first high-side switch and a first low-side switch;
    a second high-side switch and a second low-side switch connected to a node between the first high-side switch and the resonator; and
    a switching controller that controls at least one switching period of the power converter system using soft-switching, wherein the switching controller controls the at least one switching period based at least in part on an off-timing associated with a particular gain.

16. The system of claim 15, wherein the second high-side switch and the second low-side switch are connected in parallel with the resonator and the first low-side switch between the node and ground.

17. The system of claim 15, wherein the switching controller causes the first high-side switch, the second high-side switch, the first low-side switch, and the second low-side switch to be closed into zero-voltage throughout the at least one switching period.

18. The system of claim 15, wherein the switching controller identifies the off-timing associated with a predetermined gain, wherein the particular gain is the predetermined gain.

19. The system of claim 18, wherein the switching controller switches at least one of the first high-side switch and the second high-side switch off based at least in part on the off-timing.

20. The system of claim 15, wherein the resonator comprises an $n^{th}$-order resonant tank circuit, wherein n is an integer value greater than or equal to two.

* * * * *